United States Patent [19]
Wheadon et al.

[11] 3,808,054
[45] Apr. 30, 1974

[54] WOUND-WIRE STORAGE BATTERY GRID

[75] Inventors: Ellis G. Wheadon; Charles P. McCartney, Jr., both of Yorktown, Ind.

[73] Assignee: General Motors Corporation, Detroit, Mich.

[22] Filed: Oct. 8, 1971

[21] Appl. No.: 187,682

[52] U.S. Cl................ 136/64, 136/60, 136/74
[51] Int. Cl. .................................... H01m 35/04
[58] Field of Search ............ 136/64, 60, 74, 36, 37, 136/48, 63

[56] References Cited
UNITED STATES PATENTS

| | | | |
|---|---|---|---|
| 3,556,854 | 1/1971 | Wheadon et al. | 136/37 |
| 1,528,963 | 3/1925 | Adams et al. | 136/48 |
| 1,044,831 | 11/1912 | Wackwitz | 136/48 |
| 3,652,336 | 3/1972 | Wheadon et al. | 136/60 |
| 969,387 | 9/1910 | Michael | 136/74 |
| 518,966 | 5/1894 | Phillips & Entz | 136/74 |
| 348,482 | 8/1886 | Trippe | 136/74 |

Primary Examiner—A. B. Curtis
Assistant Examiner—C. F. LeFevour
Attorney, Agent, or Firm—L. B. Plant

[57] ABSTRACT

A storage battery grid cut from a continuous strip of wound-wire grid segments. Continuous lengths of a plurality of wires periodically are gathered into lug-forming nested loops and fan-like arrays of conductors. Nonconductive reinforcing filaments crisscross and are bonded to the conductors at a plurality of fusion-interlocked joints.

1 Claim, 9 Drawing Figures

PATENTED APR 30 1974
3,808,054
SHEET 1 OF 4
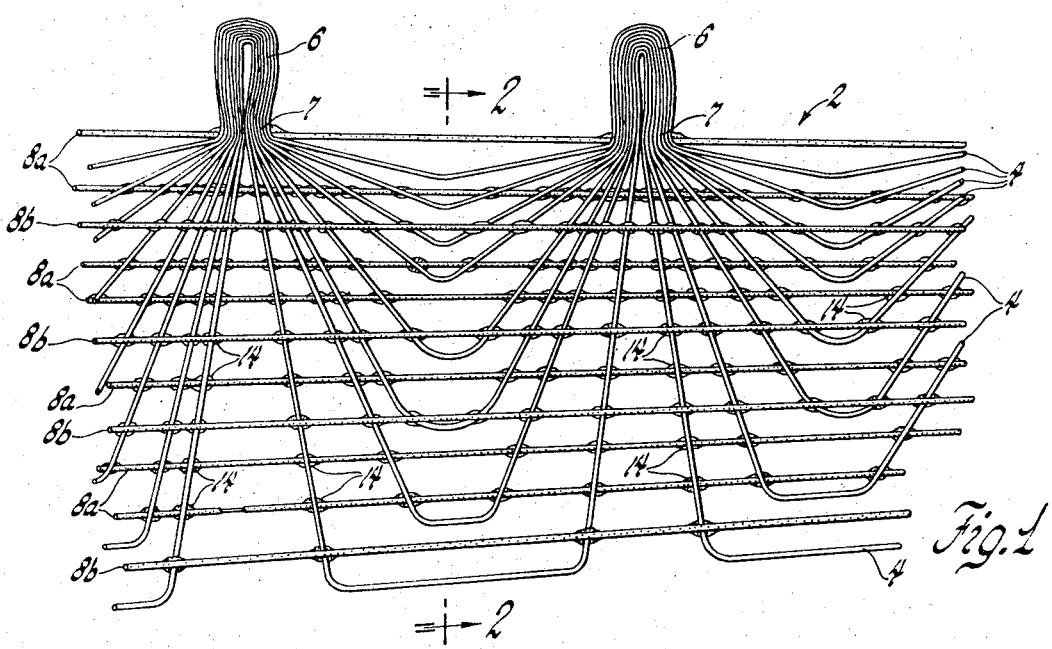
Fig.1
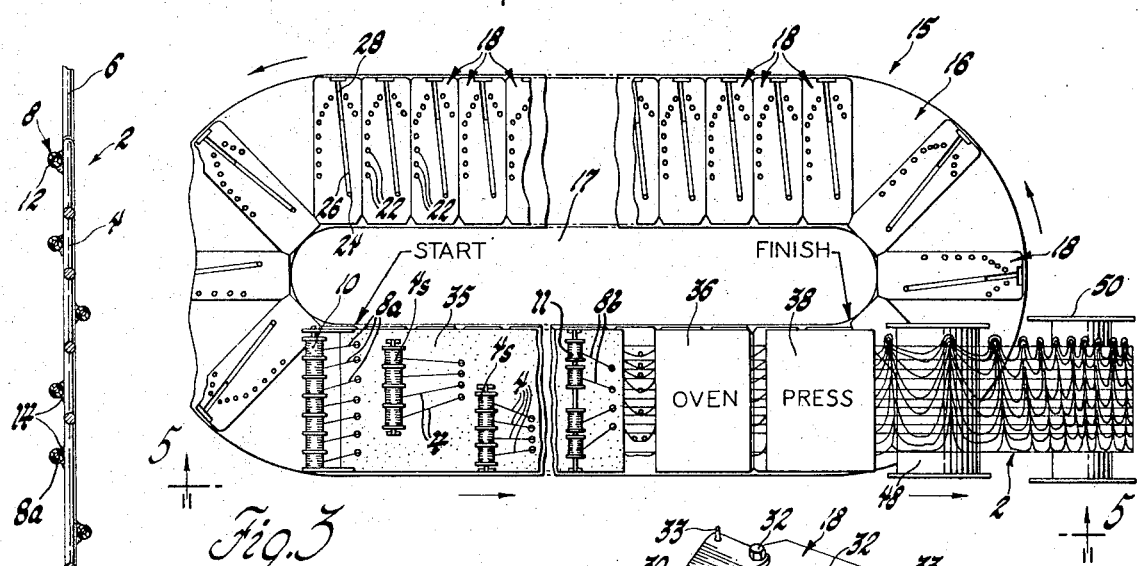
Fig.3
Fig.2
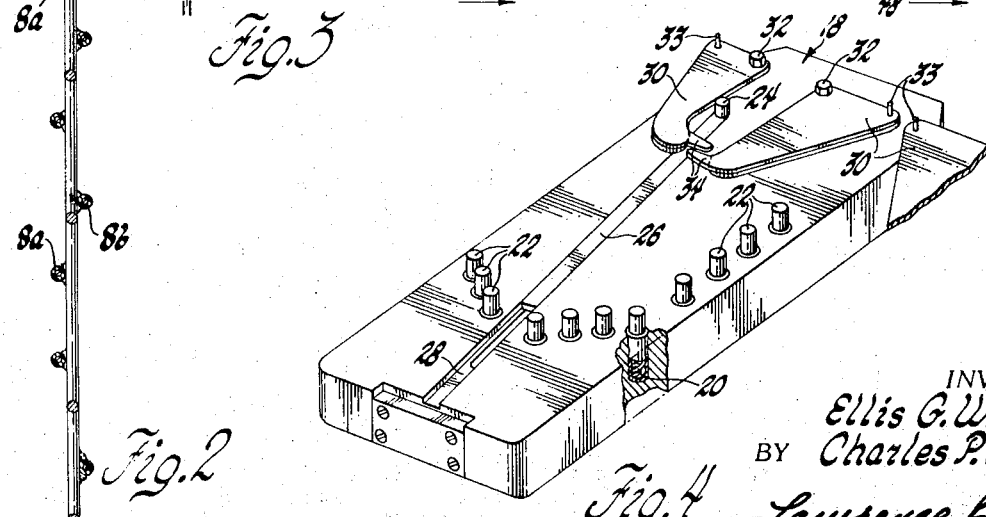
Fig.4
INVENTORS
Ellis G. Wheadon &
BY Charles P. McCartney
Lawrence B. Plant
ATTORNEY

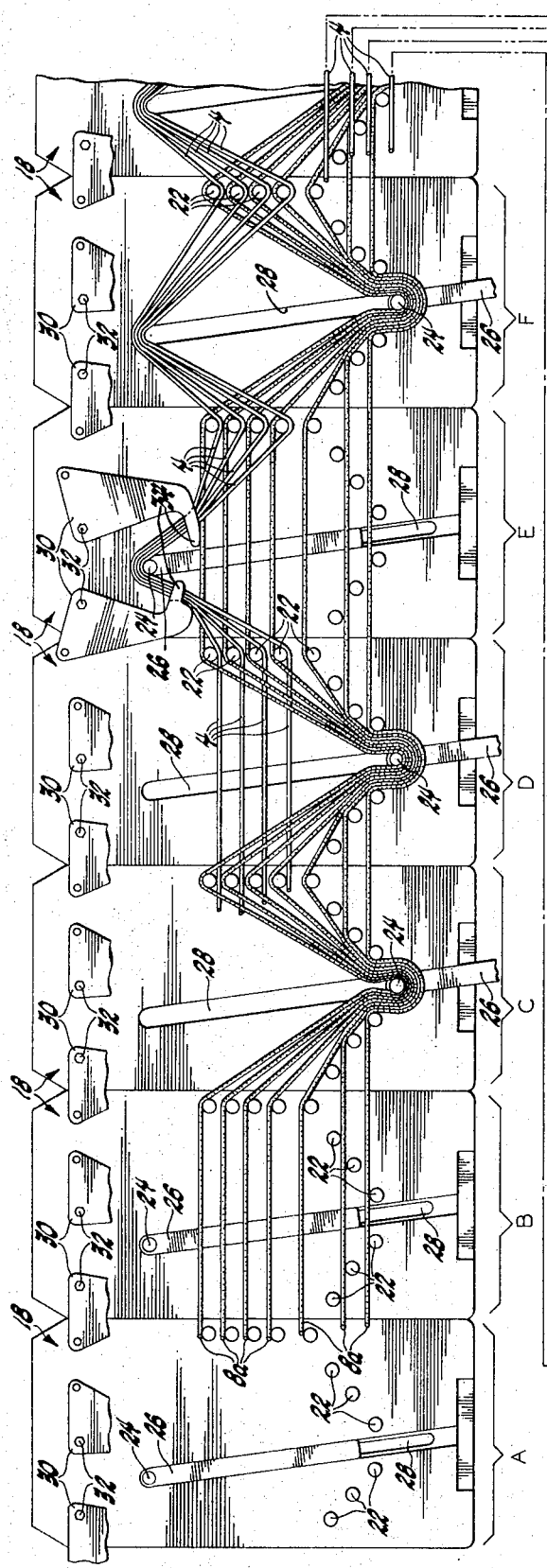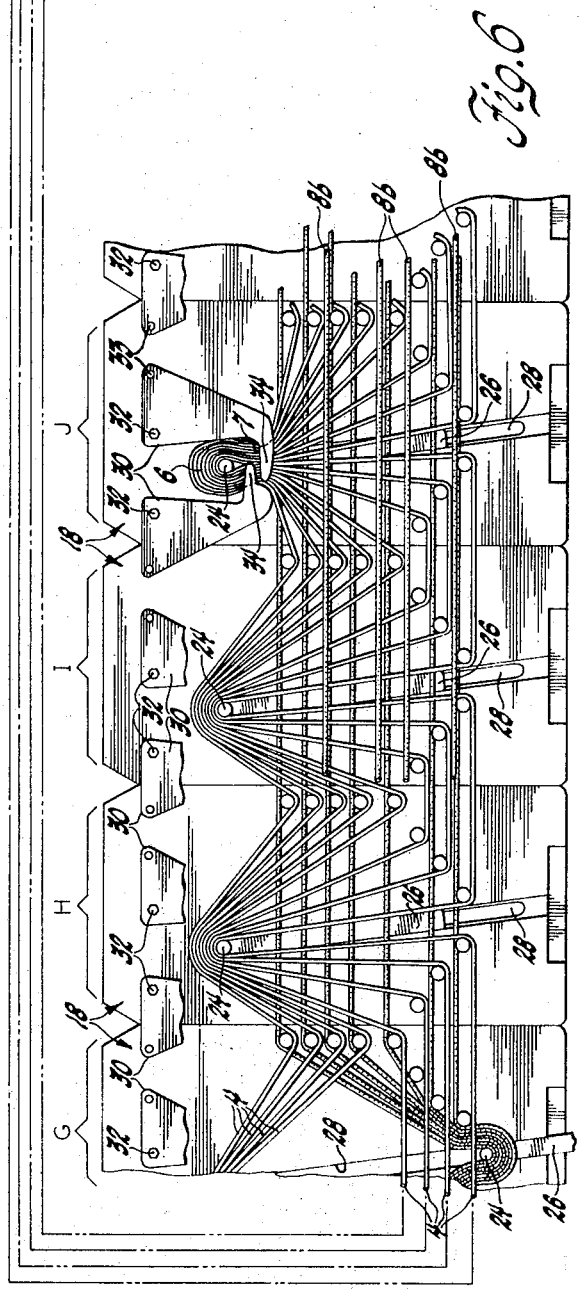
Fig. 6

INVENTORS
Ellis G. Wheadon &
BY Charles P. McCartney
Lawrence B. Plaut
ATTORNEY

WOUND-WIRE STORAGE BATTERY GRID

This is a Division of application Ser. No. 70,008, filed Sept. 8, 1970 and assigned to the assignee of the present application.

This invention relates to grids for storage battery electrode plates. Such grids support the plate's active material and enhance conductivity through the plates. More particularly, this invention relates to a wound-wire storage battery grid and a process for manufacturing a continuous strip thereof from continuous lengths of wire. Lead-acid storage battery grids are principally commerically made by casting the grids usually in pairs, from appropriate lead alloys. The cast grids are then separately pasted which requires the mid-process handling of a multitude of discrete parts. Likewise, the thusly cast grids contain more metal than is necessary to provide conductivity. To reduce the weight and metal content of grids, it has been proposed to form a composite between a fanned current collector and a plastic support member. Such a composite may be found in Helms U.S. Pat. No. 3,269,863 (8/30/66) and Wheadon et al., U.S. Pat. application Ser. No. 780,068, filed Nov. 29, 1968 and assigned to the assignee of this invention. Likewise, it has been proposed to punch grids from a continuous strip of plastic and flame-spray the plastic to render it conductive. In this regard, see Willmann et al., U.S. Pat. application Ser. No. 25,630, filed Apr. 6, 1970 and assigned to the assignee of this invention. This latter approach was directed toward providing lightweight grids which could be pasted as a continuous strip rather than as individual grids or grid pairs. The problem has been to find the right combination of ingredients which could produce a continuous strip of grids for process ability while at the same time result in individual plates which would meet industry performance norms.

It is an object of this invention to produce continuous strips of wound-wire battery grid segments from continuous lengths of wire and thermoplastic coated reinforcing filaments which grid segments, when separated from the strip, form plates meeting commerically acceptable levels of performance. This and objects and benefits of our invention will become more apparent from the detailed discussion of the process and drawings which follow: In this regard, FIG. 1 is a perspective view of a portion of one embodiment of a strip of grids formed in accordance with this invention;

FIG. 2 is an end view of the FIG. 1 strip taken along the lines 2—2;

FIG. 3 is a plan view of an apparatus for manufacturing the grid strip of FIG. 1 in accordance with the process of this invention;

FIG. 4 is a sectioned perspective view of a grid-forming block usable in conjunction with the apparatus depicted in FIG. 3;

Figure 8:
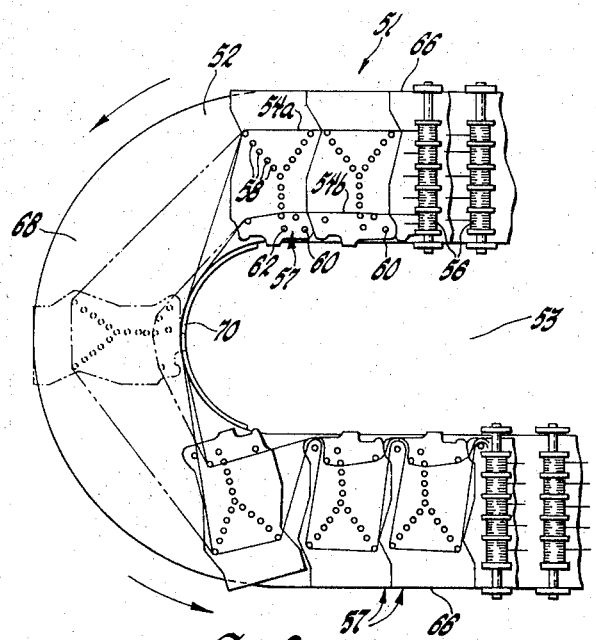
Figure 9:
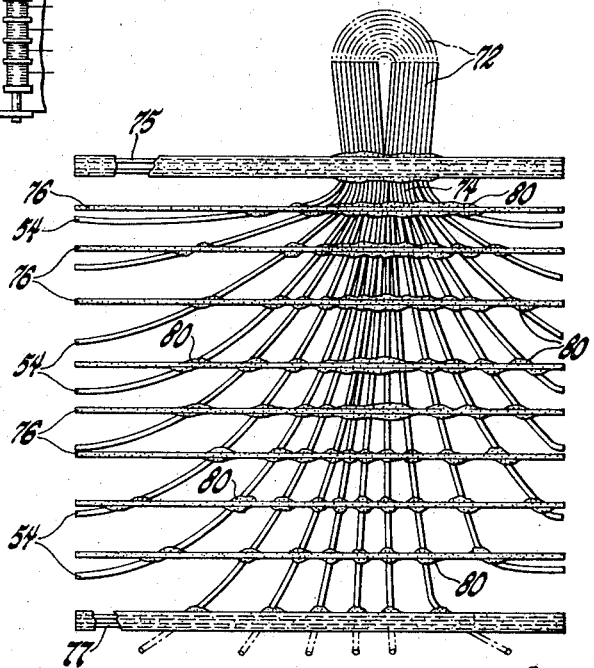
Figure 7:
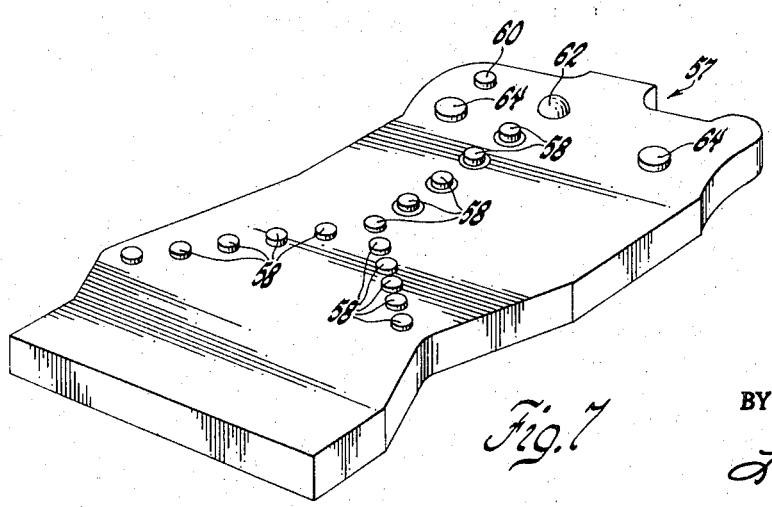

FIG. 6, in plan view, depicts, stepwise, the grid-forming sequence of the blocks of FIG. 4 as they rotate through the apparatus of FIG. 3 to perform the process of this invention;

FIG. 7 is a perspective view of another grid-forming block embodiment used with the apparatus of FIG. 8;

FIG. 8 is a partial plan view of another embodiment of an apparatus for manufacturing grid strips in accordance with the process of this invention; and FIG. 9 is a plan view of one embodiment of a finished grid segment cut from a strip prepared according to this invention.

With reference to FIGS. 1 and 2, a two-grid segment portion of a grid strip 2 is shown. This embodiment of grid strip 2 has a plurality of winding metal wires 4 fusion-bonded at joints 14 to reinforcing, nonconductive filaments 8. In this embodiment, a number of the filaments 8a lie on one side and a number of filaments 8b on the other side of the wires 4. The reinforcing filaments 8 have a thermoplastic coating 12 thereon. Periodically, during processing, the wires 4 are gathered to one side of the strip to form a cluster of nested wire loops 6 which serve as conductive lugs for joining the grids to like grids in a completed cell.

Figure 5:
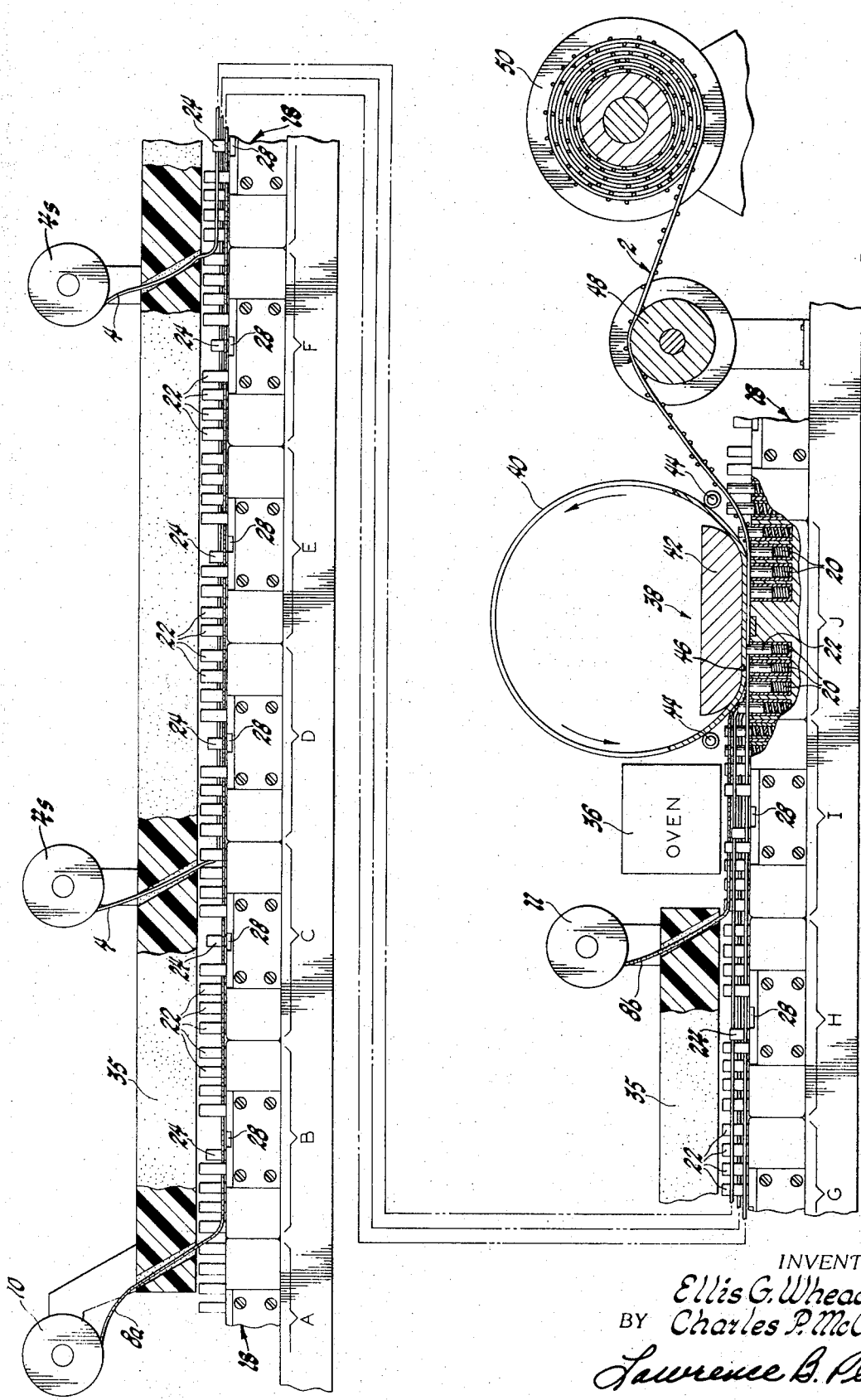
FIG. 5 is an enlarged, side elevation of a portion of the apparatus shown in FIG. 3.

With reference to FIGS. 3 and 4, one embodiment of a process is described for making the grid strip of FIGS. 1 and 2. A carrousel-like machine 15 has an oval track 16 about an island 17. The track 16 is filled with a number of grid-forming blocks 18 which continuously circulate around it. The blocks 18 (FIG. 4) have an upper working face where the wires 4 and filaments 8 are manipulated in a winding and gathering fashion to form a predetermined grid pattern. A plurality of depressible pilot pins 22 are biased upwardly through the face of block 18 by springs 20. A gathering pin 24 is affixed to a slide 26 which together traverse the length of the block 18 in the track 28 and between the pilot pins 22 in the manner indicated. The direction of motion of the gathering pin is controlled by appropriate cams, not shown, located in the block 18 and track 16. A pair of cam-actuated jaws 30 provide means for grasping and crimping the looped wires 6 during the lug-forming steps. The jaws rotate about the pivots 32 in response to camming actions against the pins 33. Undercut fingers 34 at the extremities of the jaws 30 grip and crimp the loops 6 without causing the wires at the neck 7 of the loop 6 to stack up. The individual grid segments are formed on these blocks 18 as they progress along one leg of the oval with the remainder of the track 16 being utilized to return the blocks 18 to the starting position (START) of the process. At the starting position (START), the forming blocks 18 enter closely under a plate 35 and receive a first row of filaments 8a which are payed out from spools 10. The plate 35 keeps the filaments and wires in place. As they move along the track, the blocks 18 subsequently receive rows of wires 4 from the spools 4s and finally more filaments 8b from spools 11. Between the laying of each successive row of filaments 8 or wires 4 and between each series of spools, operations are performed by the blocks 18 which cause gathering of the wires 4 into the desired shape. The wires and filaments are arranged to overlie and crisscross one another prior to entering the oven 36. The precise details of these operations will be described hereafter in conjunction with a discussion of the winding and gathering sequence (A-J) depicted in FIGS. 5 and 6. The strip moves into the oven 36 where the metal wires 4 are heated and the thermoplastic coating 12 on the filaments 8 softened. Hot and soft, the respective wires 4 and coated filaments emerge from the oven 36 and pass beneath a press 38 which forces the hot wires into the soft plastic and unites them. A continuous strip of grids emanating from the press 38 passes up and over roller 48 and after trimming is ready for pasting. Since the other battery plate making steps are not a part of this invention, the strip is depicted as being accumulated on take-up reel 50. It is understood, however, that uninterrupted continuous pasting, curing, etc. of a continuous strip of grids is one of the benefits of this invention. To get the process under way the ends of the wires and filaments are fixed to the lead block which begins pulling out lengths of the material. After this is done the wires and filaments pay out continuously. FIGS. 5 and 6 graphically depict the stages A – J through which the processing blocks 18 pass between the points marked (START) and (FINISH) on FIG. 3 as well as the relationship between the wires 4, filaments 8, pilot 22 and gathering pins 24 at each stage. At stage A, an empty block 18 enters closely under plastic plate 35 such that the pilot pins 22 all but touch the bottom of the plate 35. At stage B, filaments 8a feed from the spools 10 onto the moving blocks 18 and between the pilot pins 22, as best shown in FIG. 6. At this point, the gathering pin 24 and slide 26 are in a forward position near the top of the block 18. As the block 18 advances from stage B to stage C camming means (not shown) drive the slide 26 and gathering pin 24 downwardly in the track 28 with the pin 24 gathering all the filaments 8a in its path to the bottom of the block 18 (stage C). With the filaments 8a gathered about the pin 24 at the bottom of the block 18, a first row of metal wires 4 are laid between the upper set of pilot pins 22, as shown at stage D. As the block 18 advances between stages D and E another camming means (not shown) drives the slide 26 and gathering pin 24 upwardly to again traverse the block through the track 28 and in so doing return the filaments 8a to their original position across the block and at the same time gather the metal wires 4 to the top of the block 18. At the top of the block 18, the wires 4 are partially gripped by the fingers 34 of the jaws 30. In this regard see Stage E. Unlike the filaments 8a the wires 4, after being bent around the gathering and guide pins, tend to retain the bends formed in them. As the block 18 advances between stages E and F another camming means drives the slide 26 and gathering pin 24 downwardly toward the bottom of the block 18, again gathering the filaments 8a in its path to the bottom (stage F) while leaving the wires 4 loosely gripped within the jaws 30 as in stage E. With the filaments 8a gathered at the bottom of the block 18, a second, but lower, row of wires 4 are laid between the remaining pilot pins as best shown in stage G. As the block 18 advances between stages G and H the slide 26 and gathering pin 24 is again cammed upwardly through the track 28 again returning the filaments 8a to their original position while this time gathering the lower row of wires 4 toward the upper end of the block 18 (see stage H), and between the jaws 30 where they are loosely gripped as in stage E. At stage I a second layer of filaments 8b is laid atop the wound wires 4. After the filaments 8 have been laid and the wires 4 wound in the manner indicated, a camming means at stage J completely closes the jaws 30 thereby tightly crimping the wires together to fully loop the wires around the gathering pin 24 and form a neck 7 between the nested loops which form the lug 6 and the fan-like array of wound wires 4 diverging from the lug 6 throughout the grid segment.

After winding the grid segments in the manner indicated and with the pilot and gathering pin still extending upwardly, the forming blocks 18 pass beneath a heating means, such as an infrared oven 36. The oven 36 heats the thermoplastic coating on the filaments a and heats the wires 4 preparatory to fusion-bonding one to the other. After leaving the oven 36, block 18 passes beneath a press 38 in which the heated wires 4 and filaments 8 are pressed together causing the wires 4 to embed in the thermoplastic coating 12 on the filaments 8 and form the fusion-bonded joints 14. One embodiment of press 38 is shown in FIG. 5 and involves a stainless steel belt 40 which revolves at the same linear velocity as the grid strip 2. The stainless steel belt 40 passes over rollers 44, beneath anvil 42 and is spaced from the top working face of the block 18 by a distance equal to the design thickness of the grid. As the blocks 18 pass beneath the anvil 42, which has a flat bottom 46, the pilot 22 and gathering pins 24 are depressed into the block and against the springs 20 and the belt 40 applies direct pressure on the filaments 8 and wires 4 causing the wire 4 to embed in the soft thermoplastic coating 12.

After the fusion-bonded joints 14 are formed in the press 38, the grid strip 2 is ready for subsequent processing into finished battery plates. Subsequent processing steps would include such steps as trimming the grid strip 2 to a design width, continuously pasting the strip 2, drying and curing the paste where necessary. However, since these latter plate-forming steps do not constitute an essential part of this grid-forming invention, the strip 2 is simply shown as passing over a guide-roller 48 and onto a take-up drum 50. The loaded drum 50 may be stored, moved to another location in a plant for unwinding or even eliminated as indicated above.

FIGS. 7 and 8 show another embodiment of grid-forming block 57 and strip-forming machine 51 for carrying out the process of this invention in the manufacture of the grid shown in FIG. 9, also part of this invention. With reference to FIG. 8, a portion of another carrousel-like machine 51, with an oval track 52 and center island 53 is shown. A number of grid-forming blocks 57 circulate around the track 52. In this machine 51 the forming blocks 57 move through the curve 68 separately and move contiguously only through the straightaway portions 66 of the track 52. Though not shown, the curve 68 of the track 52 has a cover plate, much like the plate 35 of FIGS. 3 and 5, under which the blocks 57 pass. The fixed pilot pins 58 on the forming block 57 are spaced immediately adjacent the bottom of the plate when moving through the curve to prevent any of the wires 54 from slipping off over the appropriate pilot pins when passing under the plate. In the embodiment of the apparatus shown in FIG. 8 the wire winding and gathering is accomplished quite simply and with fewer moving parts than with the FIG. 3 apparatus. In this embodiment, wires 54 are fed from spools 56 onto the forming blocks 57 before the blocks 57 enter the curve 68. In order to avoid complicating FIG. 8 by needlessly showing all the wires 54, there is shown only the outermost wire 54a and innermost wire 54b. It is to be understood, however, that other wires from each of the spools 56 would be fed onto the blocks 57 between the several pilot pins 58 and all wound and gathered together in a single operation. The grid-forming blocks 57 themselves have a number of fixed pilot pins 58, a depressible gathering pin 60, and a gathering pin depressing means such as the button 62 which when cammed downwardly depresses the gathering pin 60 into the face of the block 57, there being an appropriate linkage (not shown) therebetween. Two of the pins 64, in addition to being pilot pins, also serve to crimp the looped wires about the gathering pin 60 during the lug formation stage. Referring again to FIG. 8, the blocks 57 with the wires 54 thereover are pulled away from the line of blocks in the upper straight-away 66 and one by one pulled around the curve 68 and aligned with the blocks in the lower straight-away of the oval track 52. As the individual blocks 57 enter the curve 68, a cam on the cover plate (not shown) depresses the buttom 62 thereby depressing the gathering pin 60 below the face of the block 57. As the block 57 moves through the curve 68 with the gathering pin 60 depressed, all the wires 54 bunch up near the apogee 70 of the island 53 in the center of the track 52. There is one point during the path of the block 57 through the curve 68 when the wires 54 all bunch up or collect in a very narrow region near the upper left-hand corner of the block 57 between the depressed gathering pin 60 and the left lug-forming and crimping pilot pin 64. At this point the button 62 is released causing the gathering pin 60 to rise and project upwardly from the face of the block 57 thereby trapping the collected wires between the gathering pin 60 and the lug-forming pin 64. The precise point in the curve 68 where all the wires are collected as indicated will of course vary depending on the dimensions of a given track 52 and block 57. In one particular embodiment of this type of apparatus, the forming plate 57 has a width of about 5.5 inches, a height of about 10.6 inches and pilot and gathering pins about 0.045 inch high. The pins are spaced about 0.005 inch from the bottom of the plate over the curve 68. The track 52 is about 23.4 inches wide overall with an inner island of about 1.87 inch wide. In that embodiment the curve 68 at the end of the track 52 is more semielliptical than semicircular and has a major axis which is perpendicular to the straight-aways 66 and has an inside radius along that axis of about 1.38 inch and an outside radius of about 11.62 inches. The minor axis of the curve which parallels the straight-aways 66 passes through the apogee of the island 53, has an inside radius of about 1.0 inch and an outside radius of about 11.35 inch. In this embodiment the gathering pin 60 rises when the centerline of the block 57 moving through the curve 68 is at about 8:30 o'clock when viewing the machine from above as is done in FIG. 8. In any event, with the gathering pin 60 up and the wires 54 trapped between it and the left lug-forming pin 64 the block 56 enters the straight-away 66 and is jostled into contiguous relation with the next preceding block 57. Alignment of the blocks 57 is facilitated by providing complementary shaped blocks which provide an aligning camming action as the blocks enter the lower straight-away 66. During this alignment in the lower straight-away 66 the right-hand lug-forming pin 64 completes the looping action of the wires 54 around the pin 60 and slightly crimps the looped wires to form a neck 74 in the lug 72. After the wires 54 have been looped and crimped about the gathering pin 60, the blocks 57 traverse the lower straight-away 66 of the track 52 where the reinforcing filaments are applied. In this embodiment, only one layer of filaments 76 is applied and that only on the top of the wound wires 54. The filaments 76 feed from the spools 78 located from atop the track 52, as shown. After laying the filaments 76 the strip is heated and pressed to bond the filaments and wires in much the same manner as discussed in conjunction with FIG. 3. In this embodiment, however, since the pilot pins 58 do not depress into the block 57 the press 38 must complement the shape of the block 57 at least to the extent of having holes corresponding to the location of the pins 58. This is conveniently accomplished in practice by having a plurality of complementary shaped platens (not shown) moving on a belt over the track 52 and engaging each block 57 at the pressing or bonding stage 38. The holes in the platens mate with the pins on the block so that the pressure is applied directly to the wires and filaments. Other means for pressing the wires and filaments together after heating and which are known to those skilled in the art of machine design could also obviously be used. It is likewise noted at this point that the straight-away portions 66 have been referred to as "upper" and "lower." These terms have been used to simplify description and relate only to the orientation of FIG. 8 on the drawings. In part, the track 52 is horizontal and therefore would not have an upper and lower portion.

FIG. 9 shows a grid formed from the process depicted in FIG. 8 after the bottom edge has been trimmed (see phantom lines). The lug 72 is a series of wire loops nested within each other and formed by wrapping wires 54 around the gathering pin 60. A finished battery plate would have the curved portion of the loop trimmed off (see phantom lines), as necessary, to insure lug and plate size uniformity for subsequent processing. Thermoplastic coated filaments 75, 76 and 77 are attached to the wires 54 at the fusion-bonded joints 80. In a preferred embodiment, the thermoplastic coated filaments 75 and 77, which form the upper and lower borders of the grid, comprise an extra-strong ribbon formed from two spaced filaments within a single thermoplastic coating.

It is to be appreciated that the principles involved here are applicable to the manufacture of battery grids for most any electrochemical system employing grids realizing, of course, that the selection of materials would vary depending on the cell's reactants and environment, i.e., acid or caustic. In one particular example of this invention as it relates to the Pb-acid battery system the metal wires are 0.045 inch diameter Pb-alloy wire containing about 0.0015% Sb max, about 0.0015% As max, 0.05% Bi max, 0.08 Ca and the balance Pb. These wires are knurled prior to winding and looping to provide a better fusion-bonded joint with the thermoplastic coated filaments. The filaments are preferably made of fiberglass strands about 0.007 inch to 0.009 inch in diameter and coated with a thermoplastic material to provide an overall diameter about 0.037 inch to 0.043 inch before bonding. The two-filament ribbon borders are about 0.120 inch wide and about 0.052 inch thick. The thermoplastic coating is of the hot melt type having a polyethylene base. In general, though for Pb-acid batteries a number of base polymers could be used as long as they are free from metallics, alcohol or acetic acid and their derivatives or other battery contaminants. A presently preferred material is known as Eastobond M-32. The oven 30 is maintained at a temperature of about 220°F. and the wires and filaments pressed together under a pressure of about 15 psi.

While this invention has been disclosed primarily in terms of certain specific embodiments thereof, it is not intended that it be limited thereto, except to the extent hereinafter provided.

We claim:

1. A single wound-wire storage battery grid comprising a lug at the top of said grid for connecting said grid to like grids in a storage battery, a plurality of discrete, electrically conductive wires extending in a fan-like configuration substantially throughout the grid and terminating in ends at the side and bottom edges of the grid, said wires being gathered together into a cluster intermediate the ends of the wires, said cluster comprising a truncated nest of loops in the wires and forming said lug, non-conducting inorganic reinforcing filaments secured to said wires at spaced intervals on said filaments to hold said wires apart in said fan-like configuration and to give strength to the grid, and a thermoplastic coating on said non-conductive filaments embedding said wires in substantially the same plane as said coated filaments and at a plurality of fusion-bonded joints at the loci of intersection of said wires and coated filaments and wherein substantially only said coating embeds said wires.

* * * * *